United States Patent
Beller et al.

(10) Patent No.: US 9,928,235 B2
(45) Date of Patent: *Mar. 27, 2018

(54) TYPE-SPECIFIC RULE-BASED GENERATION OF SEMANTIC VARIANTS OF NATURAL LANGUAGE EXPRESSION

(71) Applicant: International Business Machines Corporation, Armonk, NY (US)

(72) Inventors: Charles E. Beller, Baltimore, MD (US); Edward G. Katz, Washington, DC (US); Alexander C. Tonetti, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,946

(22) Filed: Jul. 7, 2016

(65) Prior Publication Data

US 2018/0011837 A1 Jan. 11, 2018

(51) Int. Cl.
*G06F 17/27* (2006.01)
*G06F 17/30* (2006.01)

(52) U.S. Cl.
CPC ...... *G06F 17/2785* (2013.01); *G06F 17/2795* (2013.01); *G06F 17/30654* (2013.01); *G06F 17/30684* (2013.01)

(58) Field of Classification Search
USPC .......................................... 704/257, 270, 9
See application file for complete search history.

(56) References Cited

U.S. PATENT DOCUMENTS

| 5,197,005 A | 3/1993 | Shwartz et al. |
| 5,918,222 A * | 6/1999 | Fukui ............... G06Q 10/10 |
| 5,991,719 A * | 11/1999 | Yazaki ............... G06F 3/16 |
| | | 704/251 |

(Continued)

FOREIGN PATENT DOCUMENTS

WO WO2014/035734 A1 3/2014

OTHER PUBLICATIONS

List of IBM Patents or Patent Applications Treated as Related, Jul. 26, 2016, 2 pages.

(Continued)

*Primary Examiner* — Abul Azad
(74) *Attorney, Agent, or Firm* — Stephen R. Tkacs; Stephen J. Walder, Jr.; Diana R. Gerhardt

(57) ABSTRACT

A mechanism is provided in a data processing system having a processor and a memory storing a store of semantic types and instructions for implementing a natural language processing engine for generating semantically equivalent variants of a natural language term. The mechanism receives an input term for variant analysis. The natural language processing engine executing on the data processing system identifies a semantic type of the input term based on a store of semantic types. The natural language processing engine performs a type-specific series of rule-based expansions of the input term based on the identified semantic type of the input term to form a set of semantically equivalent variants of the input term. The natural language processing engine performs a natural language processing operation using the input term and the set of semantically equivalent variants of the input term.

20 Claims, 6 Drawing Sheets

(56) References Cited

U.S. PATENT DOCUMENTS

| | | | | |
|---|---|---|---|---|
| 6,721,706 | B1* | 4/2004 | Strubbe | G10L 15/18 704/257 |
| 6,999,930 | B1* | 2/2006 | Roberts | G10L 15/193 379/88.01 |
| 7,107,218 | B1* | 9/2006 | Preston | G06F 17/30684 704/270 |
| 7,487,094 | B1* | 2/2009 | Konig | G10L 15/19 379/88.01 |
| 7,623,648 | B1* | 11/2009 | Oppenheim | H04M 3/4931 379/218.01 |
| 8,086,444 | B2* | 12/2011 | Jarmulak | G06F 17/2785 704/10 |
| 8,123,615 | B2* | 2/2012 | Okada | G07F 17/3209 463/20 |
| 8,484,238 | B2 | 7/2013 | Loeser et al. | |
| 8,640,087 | B2 | 1/2014 | Sabbouh | |
| 8,645,122 | B1* | 2/2014 | Di Fabbrizio | G10L 21/00 704/231 |
| 8,924,269 | B2 | 12/2014 | Seubert et al. | |
| 8,930,386 | B2 | 1/2015 | Mayr et al. | |
| 9,047,578 | B2 | 6/2015 | Dvorak et al. | |
| 2009/0287678 | A1* | 11/2009 | Brown | G06F 17/30654 |
| 2011/0066587 | A1 | 3/2011 | Ferrucci et al. | |
| 2011/0125734 | A1 | 5/2011 | Duboue et al. | |
| 2013/0007055 | A1 | 1/2013 | Brown et al. | |
| 2013/0018652 | A1 | 1/2013 | Ferrucci et al. | |
| 2013/0066886 | A1 | 3/2013 | Bagchi et al. | |

OTHER PUBLICATIONS

Berrahou, Soumia L. et al. "How to Extract Unit of Measure in Scientific Documents?", KDIR/KMIS, https://www.researchgate.net/publication/256292768_How_to_extract_unit_of_measure_in_scientific_documents, Aug. 6, 2014, 8 pages.

De Bo, Jan et al., "Creating a "DOGMAtic" Multilingual Ontology Infrastructure to Support a Semantic Portal", Book, OTM Workshops 2003, LNCS 2889, Copyright 2003 (month unknown), pp. 253-266.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Katerattanakul, Nitsawan, "A pilot Study in an application of text mining to learning system evaluation", Curtis Laws Wilson Library, Missouri University of Science and Technology, Masters Theses, Paper 4771, Summer 2010, 87 pages.

Kosseim, Leila et al., "Improving the performance of question answering with semantically equivalent answer patterns", Data & Knowledge Engineering, vol. 66, Issue 1, Jul. 2008, Available online Sep. 11, 2007, pp. 53-67.

McCord, M.C. et al., "Deep parsing in Watson", IBM J. Res. & Dev. vol. 56 No. 3/4 Paper 3, May/Jul. 2012, pp. 3:1-3:15.

Merz, Ulla et al., "DIRECT: A Query Facility for Multiple Databases", ACM Transactions on Information Systems, vol. 12, No. 4, Oct. 1994, pp. 339-359.

Moldovan, Dan et al., "COGEX: A Logic Prover for Question Answering", Proceedings of the 2003 Conference of the North American Chapter of the Association for Computational Linguistics on Human Language Technology, vol. 1, Edmonton, May-Jun. 2003, 7 pages.

Strotgen, Jannik et al., "HeidelTime: High Quality Rule-based Extraction and Normalization of Temporal Expressions", Proceedings of the 5th International Workshop on Semantic Evaluation, ACL 2010, Uppsala, Sweden, Jul. 15-16, 2010, pp. 321-324.

Tamames, Javier et al., "EnvMine: A text-mining system for the automatic extraction of contextual information", BMC bioinformatics, vol. 11, No. 1, http://bmcbioinformatics.biomedcentral.com/articles/10.1186/1471-2105-11-294, Received Oct. 16, 2009, Accepted Jun. 1, 2010, Published Jun. 1, 2010, 10 pages.

Ye, Yan et al., "Ontology-based semantic models for supply chain management", The International Journal of Advanced Manufacturing Technology, vol. 37, Issue 11, Jul. 2008, Received Oct. 3, 2006, Accepted Apr. 12, 2007, Published online May 17, 2007, pp. 1250-1260.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

* cited by examiner

*FIG. 5*

QABUILDER — 500

- QUESTION ID: 501 | 1
- QUESTION: 502
- ANSWER TYPE: STRING
- ANSWER SUB-TYPE:
  CHOOSE ANSWER TYPE FOR MORE SPECIFIC INSTRUCTIONS
- ANSWER: 503 | UNITS
- ANSWER VARIANTS:
- 504 [CREATE]
- LAT: 506
- DOMAIN:
- TOPIC:
- URL:
- SOURCE:
- COMMENTS:

LIST OF ANSWER VARIANTS: 505

[CLEAR] 507    508 [ADD ENTRY]   [SAVE] 509 [DELETE ENTRY]
                                       510

| ANSWER | VARIANTS |
|---|---|
| 09/01/1939 | (0?9\|Sep(t\|tember)?)[/\.\-\|](0?1\|1st\|first)(/\|\.\|\-\|,? )((19)?'?39\|one thousand( and)? nine hundred( and)? thirty[ \|-]nine\|nineteen thirty[ \|-]nine)\|((19)?'?39\|one thousand( and)? nine hundred( and)? thirty[ \|-]nine\|nineteen thirty[ \|-]nine)[/\.\-\|](0?9\|Sep(t\|tember)?)[/\.\-\|](0?1\|1st\|first)\|(0?1\|1st\|first)[/\.\-\|](0?9\|Sep(t\|tember)?)[/\.\-\|]((19)?'?39\|one thousand( and)? nine hundred( and)? thirty[ \|-]nine\|nineteen thirty[ \|-]nine)\|((19)?'?39\|one thousand( and)? nine hundred( and)? thirty[ \|-]nine\|nineteen thirty[ \|-]nine)[/\.\-\|](0?9\|Sep(t\|tember)?)\|(0?9\|Sep(t\|tember)?)[/\.\-\|]((19)?'?39\|one thousand( and)? nine hundred( and)? thirty[ \|-]nine\|nineteen thirty[ \|-]nine)\|((19)?'?39\|one thousand( and)? nine hundred( and)? thirty[ \|-]nine\|nineteen thirty[ \|-]nine)\|Sep(t\|tember)? |

*FIG. 6A*

| ANSWER | VARIANTS |
|---|---|
| 09/01/1939 | (0?9\|Sep(t\|tember)?)[/\.\-\|](0?1\|1st\|first)(/\|\.\|\-\|,? )((19)?'?39\|one thousand( and)? nine hundred( and)? thirty[ \|-]nine\|nineteen thirty[ \|-]nine)\|((19)?'?39\|one thousand( and)? nine hundred( and)? thirty[ \|-]nine\|nineteen thirty[ \|-]nine)[/\.\-\|](0?9\|Sep(t\|tember)?)[/\.\-\|](0?1\|1st\|first)\|(0?1\|1st\|first)[/\.\-\|](0?9\|Sep(t\|tember)?)[/\.\-\|]((19)?'?39\|one thousand( and)? nine hundred( and)? thirty[ \|-]nine\|nineteen thirty[ \|-]nine |

*FIG. 6B*

| ANSWER | VARIANTS |
|---|---|
| 1939 | ((19)?'?39\|one thousand( and)? nine hundred( and)? thirty[ \|-]nine\|nineteen thirty[ \|-]nine |

*FIG. 6C*

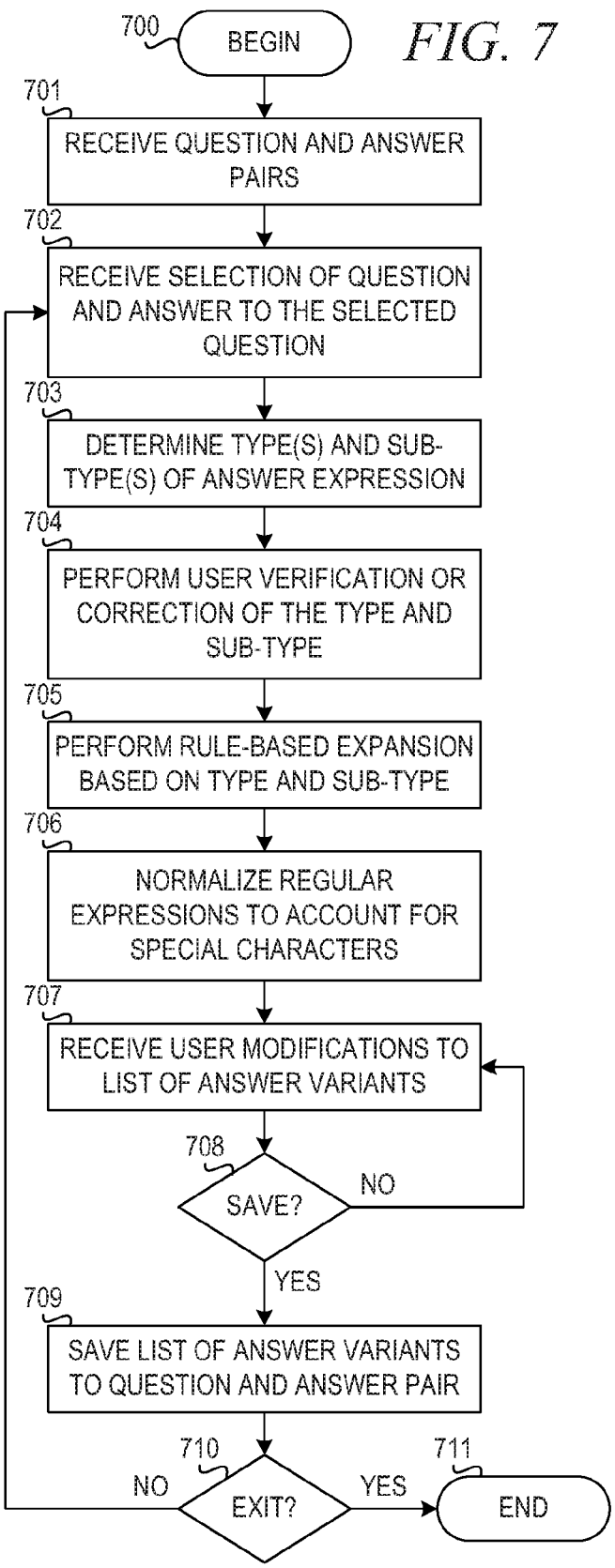

TYPE-SPECIFIC RULE-BASED GENERATION OF SEMANTIC VARIANTS OF NATURAL LANGUAGE EXPRESSION

GOVERNMENT RIGHTS

This invention was made with United States Government support under contract number 2013-12101100008. THE GOVERNMENT HAS CERTAIN RIGHTS IN THIS INVENTION.

BACKGROUND

The present application relates generally to an improved data processing apparatus and method and more specifically to mechanisms for type-based generation of semantic variants of natural language expressions for string or regular expression matching.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples of QA systems are the IBM Watson™ system available from International Business Machines (IBM®) Corporation of Armonk, N.Y., Siri® from Apple®, and Cortana® from Microsoft®. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system having a processor and a memory storing a store of semantic types and instructions for implementing a natural language processing engine for generating semantically equivalent variants of a natural language term. The method comprises receiving an input term for variant analysis. The method further comprises identifying, by the natural language processing engine executing on the data processing system, a semantic type of the input term based on a store of semantic types. The method further comprises performing, by the natural language processing engine, a type-specific series of rule-based expansions of the input term based on the identified semantic type of the input term to form a set of semantically equivalent variants of the input term. The method further comprises performing, by the natural language processing engine, a natural language processing operation using the input term and the set of semantically equivalent variants of the input term.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 depicts a view of a user interface for automatic type-based generation of semantic variants of a natural language expression in accordance with an illustrative embodiment;

FIGS. 6A-6C illustrate answer alternatives based on a plurality of policies in accordance with an illustrative embodiment; and FIG. 7 is a flowchart illustrating operation of a type-based semantic variant generation component in accordance with an illustrative embodiment.

DETAILED DESCRIPTION

Figure 1:
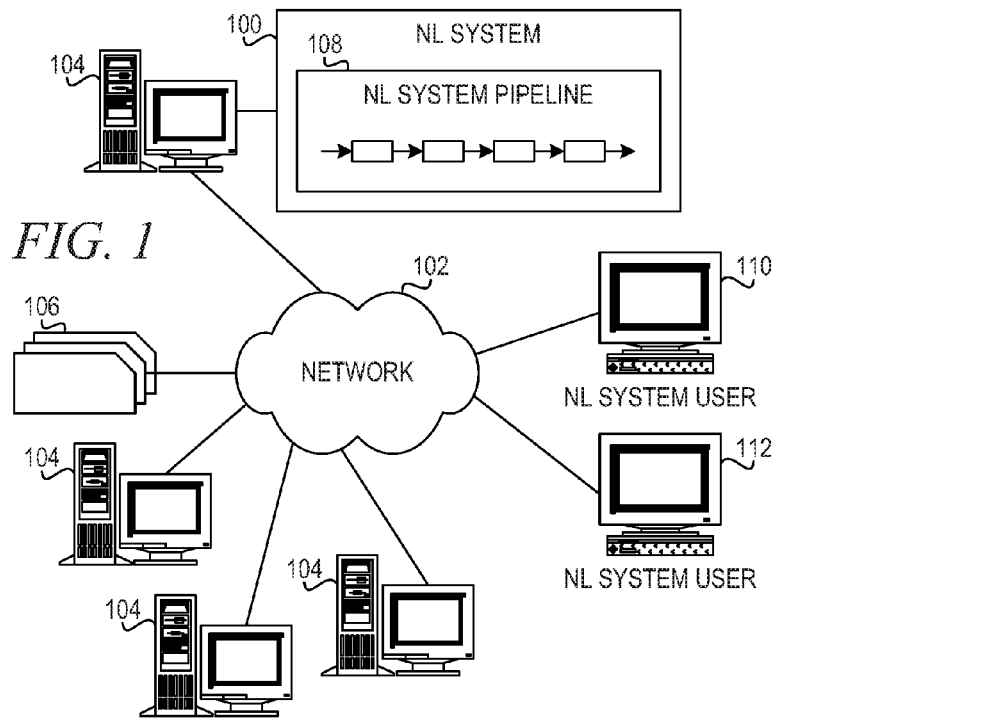
FIG. 1 depicts a schematic diagram of one illustrative embodiment of a natural language processing system in a computer network.

The illustrative embodiments provide mechanisms for automatically generating semantic variants of natural language names and expressions denoting quantities, for use in creating answer keys for automatic question answering systems. Variants are based on a canonical answer with its expression type input by a user. For example, for the canonical input "2" and the specified expression type MEASURE-LINEAR[Feet], the mechanisms provide variants, such as "24 inches" and "two feet."

A deep question answering system generates answer candidates from text passages and then passes the answer candidates to a scoring module that ranks the answer candidates with the top ranked candidate returned as the answer to the question. These answers are textual strings extracted from the text passages. In order to evaluate and train such systems, the returned answer must be classified as true or false. Answer key sets of question/answer pairs (QA pairs), typically developed manually, are used for this task. In addition to their use as training data, these QA pairs provide the basis for calculating accuracy metrics to evaluate performance of the question answering system.

Since a correct answer to even a factual question may have a number of semantically equivalent variants, to properly score the answer as correct or incorrect, these semantic variants must be included in the answer key. Providing full sets of variants is a labor-intensive and error prone activity, thus the need for an automatic mechanism for generating variants.

When creating a question and answer pair set for a question answering system, the answer should specify all true answers to a given question. For answers referring to particular entities, there is a vast range of correct answers. This is true even for questions with single distinct answers, such as answers specifying a particular numerically measured value ("12 ounces") or a specific date ("July $4^{th}$, 1776"). To illustrate, a date—even in fully specified digit-only form—can be written in various formats (e.g., "1776-7-4," "7-4-1776") with various different separators ("03/29/1991," "03-29-1991," "03.29.1991." etc.) and the presence or absence of leading zeroes. Other format variations include the use of ordinals ("1st," "2nd," "3rd," etc.), abbreviation of month names ("Jan," "Feb," "Mar," etc.), abbreviation of years ("'12," "'99," etc.), and spelling out of years ("two thousand ten," "twenty ten," etc.). Turning to expressions, such as "16 ounces," there are expression variants ("16 oz.") unit variants ("1 pound," "1 lb.") and unit conversion ("453 grams") and their variants ("0.453 kg"). Enumerating all of these expressions manually (even using abbreviation conventions such as the language of regular expressions) is a time consuming and error prone process.

The illustrative embodiments address the sweet spot in the generation of answer variants for scoring a question answering system between the enumeration of all possible orthographic and semantic variants and the manual creation of a list of acceptable alternatives. The illustrative embodiments address the important need to identify a wide range—ideally all—of the acceptable variant answers to a question with a minimum of human effort. While some of the problems the illustrative embodiments address could be partially addressed through more sophisticated normalization at the time of answer generation or merging, even a perfect method for normalization would not obviate the need for the mechanisms of the illustrative embodiments.

First, it is infeasible to presume that subject matter experts who generate question and answer pair sets would always be aware of the particularities of the normalization strategy implemented in an answer merging process, and it certainly would be an additional burden on the question and answer writer to presume that they are. Second, general and automatic normalization strategies may be inappropriate to particular questions and their answers and so question-specific alternative generation policies are needed. The invention is a method for automatic expansion that is user-configurable in two ways. The administrator can configure families of policies for expansion from which the subject matter expert, in the process of generating a particular question, can select. In addition, particular variants automatically generated are subject to human review and editing.

The illustrative embodiments provide mechanisms for automatically generating a type-dependent semantic variants of a natural language expression for string or regular expression matching, such as for question/answer pairs that are used for ground truth in training a question answering cognitive system. The mechanisms determine to which of a user-configurable list of high-level semantic types and subtypes an input expression belongs (e.g., date, name, number, currency, measure, string). In one embodiment, the mechanisms perform user verification and/or correction of the identified type and subtype. The mechanisms perform a type-specific series of rule-based expansions to generate semantic variants. In some embodiments, the mechanisms perform normalization of regular expressions to account for special characters. The mechanisms provide a graphical user interface (GUI) that allows the user to generate the semantic variants and edit the list of variants by adding or removing entries. Then, for a given question, the mechanisms generate an answer specification that references the answer expression and the list of semantic variants.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
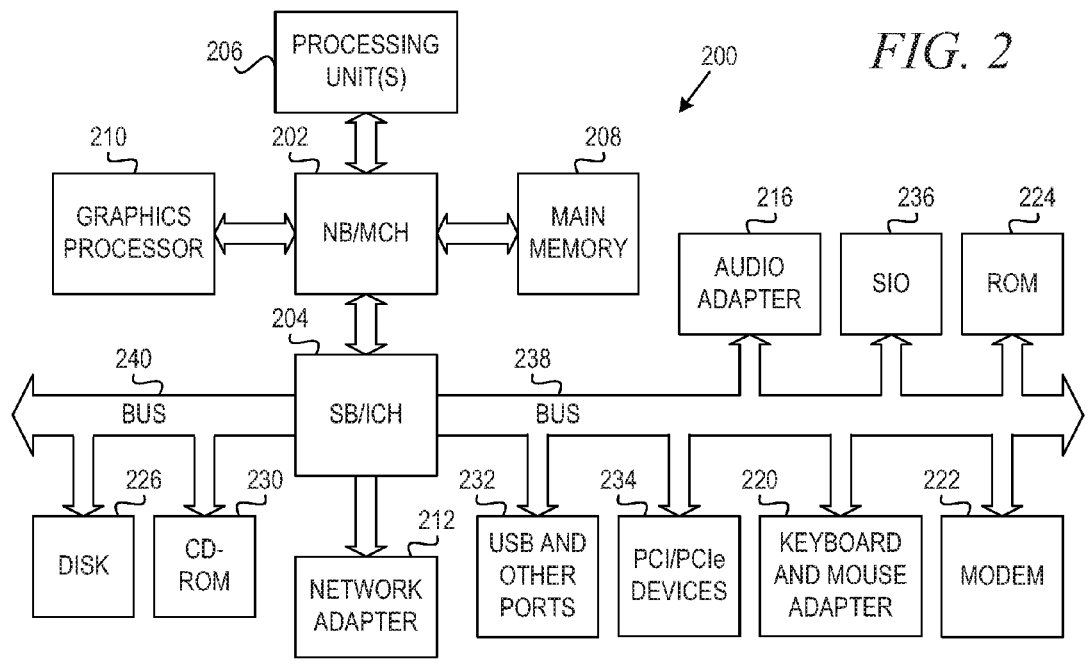
FIG. 2 is a block diagram of an example data processing system in which aspects of the illustrative embodiments are implemented.
Figure 3:
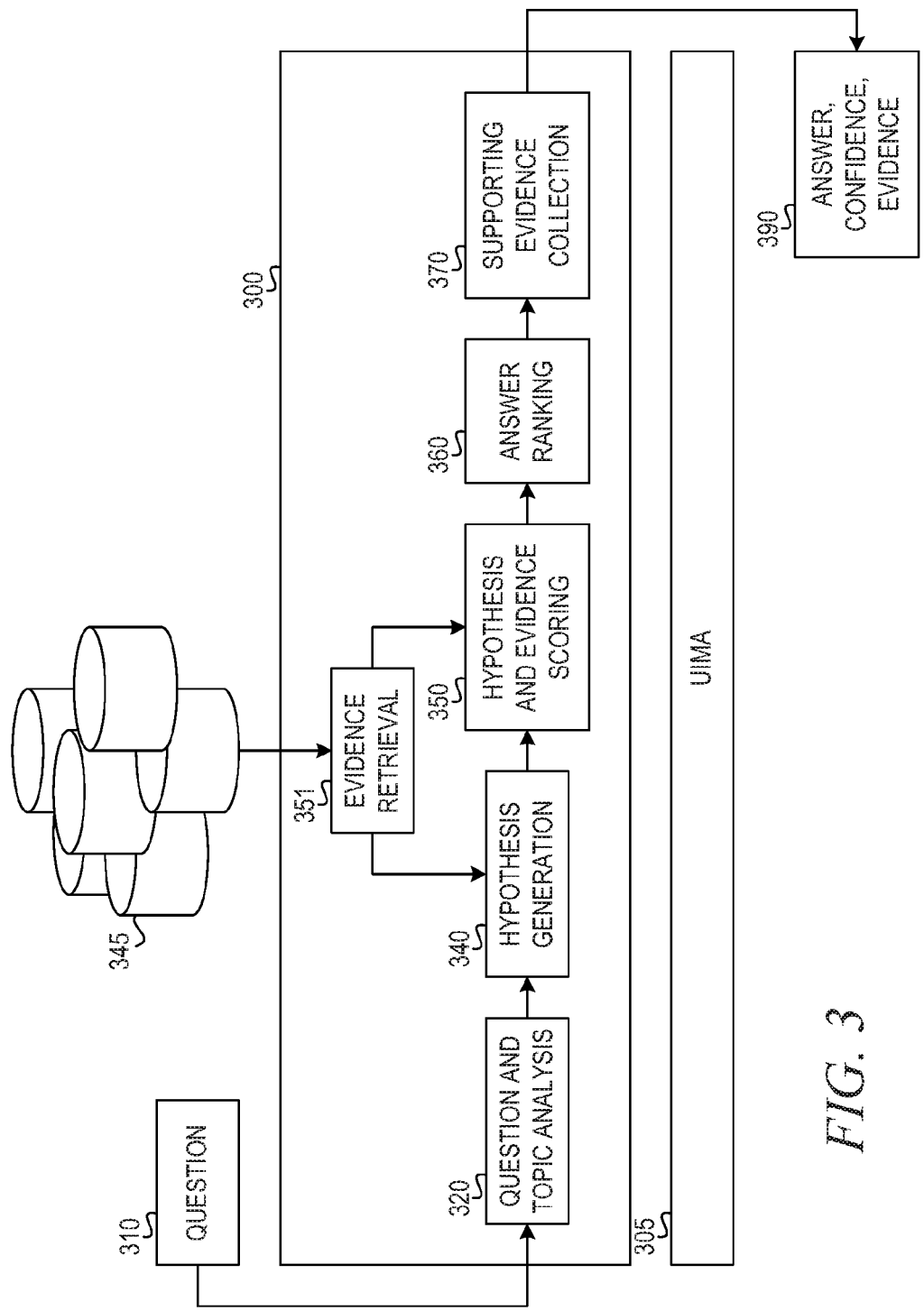
FIG. 3 illustrates a natural language processing system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example natural language (NL) processing system, such as a Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these NL processing mechanisms.

With respect to the example embodiment of a QA system, it is important to first have an understanding of how question answering in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of natural language processing mechanisms with which the illustrative embodiments are implemented. Many modifications to the example NL processing system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question, which is then interpreted by the QA system and providing a response containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g., comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information usable by the QA system to identify these question-and-answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a natural language processing system 100 in a computer network 102 in accordance with an illustrative embodiment. One example of a question/answer generation which may be used in conjunction with the principles described herein is described in U.S. Patent Application Publication No. 2011/0125734, which is herein incorporated by reference in its entirety. The NL processing system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. In the depicted example, NL processing system 100 and network 102 enables question/answer (QA) generation functionality for one or more QA system users via their respective computing devices 110-112. Other embodiments of the NL processing system 100 may be used with components, systems, subsystems, and/or devices other than those that are depicted herein.

The NL processing system 100 is configured to implement an NL system pipeline 108 that receive inputs from various sources. For example, the NL processing system 100 receives input from the network 102, a corpus of electronic documents 106, NL system users, and/or other data and other possible sources of input. In one embodiment, some or all of the inputs to the NL processing system 100 are routed through the network 102. The various computing devices 104 on the network 102 include access points for content creators and NL system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the NL processing system 100 may operate in environments of any size, including local and global, e.g., the Internet.

In one embodiment, the content creator creates content in a document of the corpus of data 106 for use as part of a corpus of data with the NL processing system 100. The document includes any file, text, article, or source of data for use in the NL processing system 100. NL system users access the NL processing system 100 via a network connection or an Internet connection to the network 102, and input questions to the NL processing system 100 that are answered by the content in the corpus of data 106. In one embodiment, the questions are formed using natural language. The NL processing system 100 analyzes and interprets the question, and provides a response to the NL system user, e.g., NL processing system user 110, containing one or more answers to the question. In some embodiments, the NL processing system 100 provides a response to users in a ranked list of candidate answers while in other illustrative embodiments, the NL processing system 100 provides a single final answer or a combination of a final answer and ranked listing of other candidate answers.

The NL processing system 100 implements a NL system pipeline 108 which comprises a plurality of stages for processing an input question and the corpus of data 106. The NL processing system pipeline 108 generates answers for the input question based on the processing of the input question and the corpus of data 106. The NL processing system pipeline 108 will be described in greater detail hereafter with regard to FIG. 3.

In some illustrative embodiments, the NL processing system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then analyzes to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of scoring algorithms. The scores obtained from the various scoring algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements an NL processing system 100 and NL system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a natural language processing system pipeline for processing an input question in accordance with one illustrative embodiment. The natural language (NL) processing system pipeline of FIG. 3 may be implemented, for example, as NL system pipeline 108 of NL processing system 100 in FIG. 1. It should be appreciated that the stages of the NL processing system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The NL system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

In the depicted example, NL system pipeline 300 is implemented in a Question Answering (QA) system. The description that follows refers to the NL system pipeline or the NL system pipeline as a QA system; however, aspects of the illustrative embodiments may be applied to other NL processing systems, such as Web search engines that return semantic passages from a corpus of documents.

As shown in FIG. 3, the NL system pipeline 300 comprises a plurality of stages 310-390 through which the NL system operates to analyze an input question and generate a final response. In an initial question input stage, the NL system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the NL system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of attention deficit disorder with relatively few side effects?," the focus is "What drug" since if this phrase were replaced with the answer it would generate a true sentence, e.g., the answer "Adderall" can be used to replace the phrase "What drug" to generate the sentence "Adderall has been shown to relieve the symptoms of attention deficit disorder with relatively few side effects."

The focus often, but not always, contains the LAT. On the other hand, in many cases it is not possible to infer a meaningful LAT from the focus.

Referring again to FIG. 3, the identified major elements of the question are then used during a hypothesis generation stage 340 to decompose the question into one or more search queries that are applied by evidence retrieval 351 to the corpora of data/information 345 in order to generate one or more hypotheses. The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used in the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated.

The NL system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. This involves evidence retrieval 351, which retrieves passages from corpora 345.

Hypothesis and evidence scoring phase 350 uses a plurality of scoring algorithms, each performing a separate type of analysis of the language of the input question and/or content of the corpus that provides evidence in support of, or not in support of, the hypothesis. Each scoring algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

For example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence that supports the candidate answers from answer ranking phase 360. From the ranked listing of candidate answers in stage 360 and supporting evidence from supporting evidence collection stage 370, NL system pipeline 300 generates a final answer, confidence score, and evidence 380, or final set of candidate answers with confidence scores and supporting evidence, and outputs answer, confidence, and evidence 390 to the submitter of the original input question 310 via a graphical user interface or other mechanism for outputting information.

Figure 4:
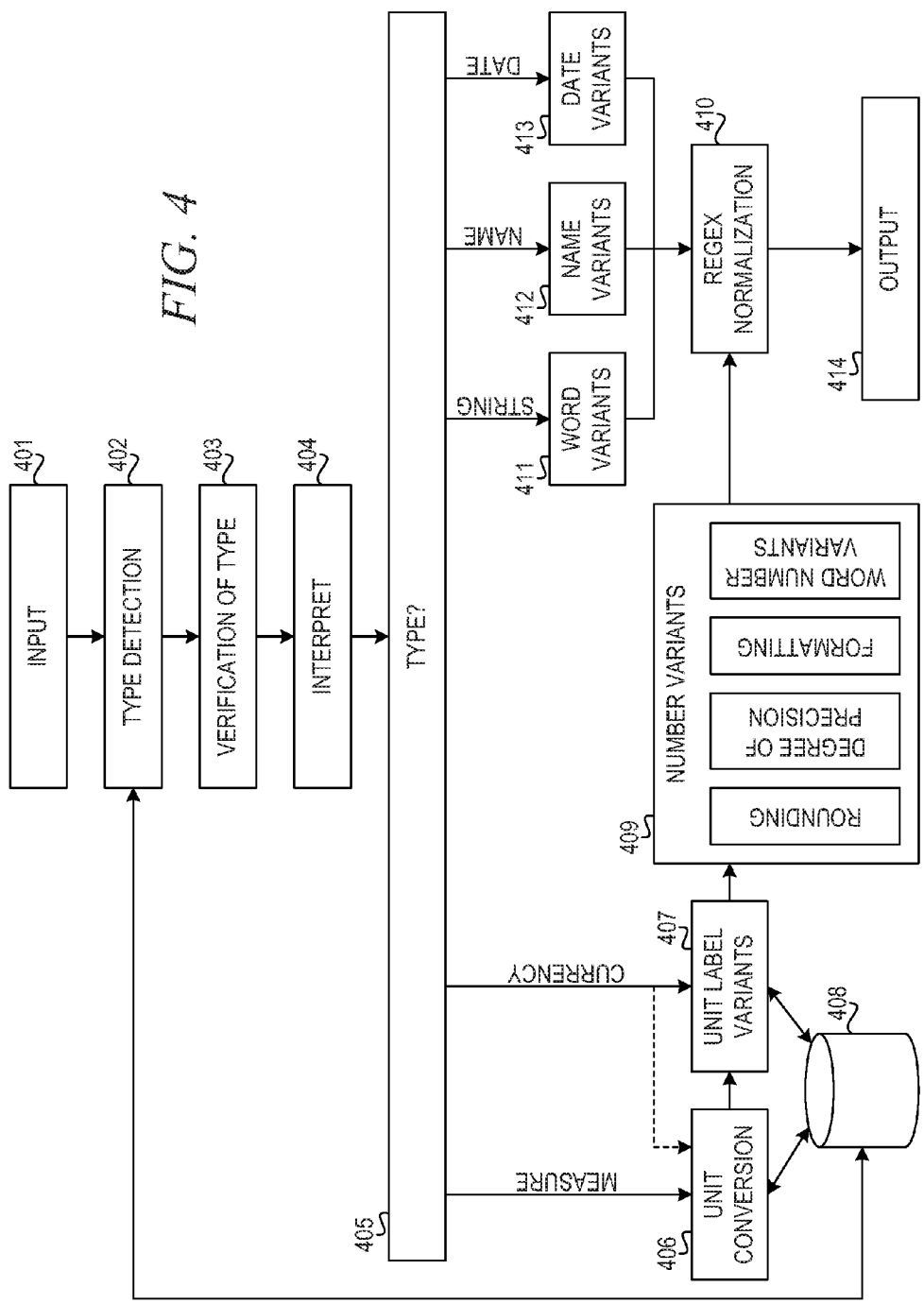
FIG. 4 is a block diagram of a type-based semantic variant generation component in accordance with an illustrative embodiment.

FIG. 4 is a block diagram of a type-based semantic variant generation component in accordance with an illustrative embodiment. The semantic variant generation component receives an input expression 401. The semantic variant generation component performs type detection (block 402) on the input expression 401 to determine to which of a user configurable list of high-level semantic types and subtypes the input expression belongs. The types and subtypes (e.g., date, name, number, currency, measure, string) are stored in storage 408. The semantic variant generation component performs user verification and/or correction of the identified type and subtype (block 403).

The semantic variant generation component interprets the type and subtype (block 404) of the input expression 401. The semantic variant generation component determines (block 405) a type-specific series of rule-based expansions. The type-specific rule-based expansions populate type-specific expansion templates at a level of specificity based on the input.

If the input expression 401 is identified with a measure type, the semantic variant generation component performs unit conversion (block 406) based on conversions among units stored in storage 408. Then, the semantic variant generation component determines unit label variants (block 407) based on variants of unit names stored in storage 408. The measure type includes the following subtypes: Linear, Temporal, Mass/Weight, Volume, etc. For measurements, the semantic variant generation component would treat all subtypes similarly by creating variations in the single set of units and then extending that by converting the measurement into other applicable units and outputting variations on those. The semantic variants for the measure type include the following:

Punctuation (9,000, 9 000, 9000, one hundred sixty five, one hundred sixty-five, etc.);
Large number word/digit combinations (1.2 million, 3 billion);
Number of decimal places (100.000, 100.00, 1.25 million, 1.3 million, 1 million, etc.);
Number as word (nine thousand, one hundred sixty-five);
Unit labels (meters, meter, m, miles, mi., etc.);
Conversion between different unit types (1 foot, 12 inches, 0.33 meters, etc.).

Then, the semantic variant generation component determines number variants (block 409). The determination of number variants in block 409 may include variants in rounding, degree of precision, formatting, and word number variants. Then, the semantic variant generation component determines number variants (block 409). The determination of number variants in block 409 may include variants in rounding, degree of precision, formatting, and word number variants. The number type includes the following subtypes: Integer, Float, Ordinal. The semantic variants for the number type include the following:

Negative numbers (minus, negative, –);
Punctuation (9,000, 9 000, 9000, one hundred sixty five, one hundred sixty-five, 15th, 15$^{th}$ etc.);
Large number word/digit combinations (1.2 million, 3 billion, 2 billionth);
Number of decimal places (100.000, 100.00, 1.25 million, 1.3 million, 1 million, etc.);
Number as word (nine thousand, one hundred sixty-five, second, fifteenth).

The semantic variant generation component performs normalization of regular expressions (block 410) to account for special characters, resulting in output expression 414.

If the input expression 401 is identified with a currency type, the semantic variant generation component determines unit label variants (block 407) based on variants of unit names stored in storage 408. The currency type includes the following example subtypes: U.S. Dollars, Australian Dollars, Euros, Singapore Dollars, etc. The semantic variants for the currency type include the following:

Negative numbers (minus, negative, −);
Punctuation ($9,000, $9 000, $9000, $9.000, etc.);
Currency Identifiers (US$, USD$, $, dollars, etc.);
Large number word/digit combinations ($1.2 million, $3 billion);
Number of decimal places ($9,000.00, $9000, $1.25 million, $1.3 million, $1 million, etc.);
Number as word (nine thousand dollars, nine thousand dollars and zero cents, etc.).

The semantic variant generation component performs normalization of regular expressions (block 410) to account for special characters, resulting in output expression 414.

If the input expression 401 is identified with a string type, the semantic variant generation component determines word variants (block 411). Then, the semantic variant generation component performs normalization of regular expressions (block 410) to account for special characters, resulting in output expression 414.

If the input expression 401 is identified with a name type, the semantic variant generation component determines name variants (block 412). The name type supports up to three names (first, middle, last), prefix, suffix, honorifics, etc. Any information that is not included, such as middle name, will not be included in the semantic variants. The semantic variants for the name type include the following:

Full name with middle (Johnathan Quentin Public);
Full name with middle initial and variations on punctuation (Johnathan Q. Public, Johnathan Q Public, etc.);
Full name without middle name (Johnathan Public);
Last name only (Public);
Common nicknames (John Public);
Prefixes, suffixes, and honorifics (John Q. Public Jr., John Quentin Public III, John Q. Public, Esquire, etc.).

Then, the semantic variant generation component performs normalization of regular expressions (block 410) to account for special characters, resulting in output expression 414.

If the input expression 401 is identified with a date type, the semantic variant generation component determines date variants (block 413). The date type includes the following example subtypes: General, Day, Month, Year, Day of Week, etc. For dates, each subtype would be treated differently. The General subtype would be the most varied, because it includes all combinations of day-month-year, day-month, month-year, and year. The Day subtype would include all variations of day-month-year. The Month subtype would include all variations of month-year and year. The Year subtype would include all variations of year. The Day of Week subtype is fairly straight-forward; it would create variants on days of the week. For all date types, if any piece of information is missing, the system would create as many variants as possible with the included information. The semantic variants for the date type include the following:

Punctuation (03/29/1991, 03-29-1991, 03.29.1991, '12, Jul., Tues., twenty ten, twenty-ten, etc.);
Ordinal numbers (July 1st, September 14th, October 2nd, etc.);
Date format (12/1/2001, 31/1/2001, 2014/12/1, etc.);
Year in words (nineteen-eighteen, two thousand two, twenty-ten, two thousand ten, etc.);
Abbreviations (Jul, Sept, Mar, Tues, Mon, etc.).

Then, the semantic variant generation component performs normalization of regular expressions (block 410) to account for special characters, resulting in output expression 414.

Other types not shown in FIG. 4 may include Percent and Range. The semantic variants for the percent type include the following:

Negative numbers (minus, negative, −);
Punctuation (9,000%, 9 000%, 9.000%, etc.);
Percent identifier (percent, percent, %);
Large number word/digit combinations (1.2 million, 3 billion);
Number of decimal places (100.000, 100.00, 1.25 million, 1.3 million, 1 million, etc.);
Number as word (nine thousand percent, nine thousand percent).

The semantic variants for the range type include Currency-USD, Currency-AUD, Currency-EUR, Currency-SGD, Currency-Other, Percent, Date-General, Date-Day, Date-Month, Date-Year, Date-Day of Week, Number-Integer, Number-Float, Measurement-Linear, Measurement-Temporal, Measurement-Mass/Weight, Measurement-Volume, Measurement-Other, etc. For ranges, the semantic variant generation component would break apart the range, create variants for each side using the above types, and then combine those variants using different range keywords. The semantic variants for the range type include the following:

Range word combiners (between $200 and $300, from $200 to $300, $200-$300);
Unit label and large-number-name abbreviation (e.g., 1-2 million, 1-2 inches, 1 million-2 million inches).

FIG. 5 depicts a view of a user interface for automatic type-based generation of semantic variants of a natural language expression in accordance with an illustrative embodiment. User interface 500 illustrates the functionality in one application of generation of a question and answer pair lit. The user inputs a question, an answer, and selects an answer type from a list of previously created answer types and a subtype, where applicable. The user may enter a question ID in field 501, or the question ID may be sequential numbers generated as the question and answer pair list is completed. The user may enter a question text in field 502 and answer text in field 503, or the question text and answer text may be entered from an existing question and answer pair list. The answer type and answer subtype may be entered using a drop-down list that is pre-populated based on a set of predetermined types and subtypes.

The user may then select the "CREATE" button 504 to automatically generate a list of answer variants that appear in field 505. The user may add answer variants by entering text into field 506 and selecting the "ADD ENTRY" button 508. The user may also clear the list of answer variants by selecting the "CLEAR" button 507, may delete an answer variant from the list of answer variants in field 505 by selecting the "DELETE ENTRY" button 510, and may save the list of answer variants by selecting the "SAVE" button 509. The list of answer variants may then be used to form an answer specification corresponding to the question text for a question and answer pair.

FIGS. 6A-6C illustrate answer alternatives based on a plurality of policies in accordance with an illustrative embodiment. In one embodiment, the semantic variant generation component may specify a plurality of policies for providing answer alternatives. For example, for Date type answers, three policies may be provided as follows: a policy to gradually back-off to a less specific granularity (e.g., the "General" policy), a policy of exact day match (the "Day" policy), and a policy of exact year match (the "Year" policy). Each of the policies is appropriate to providing alternative answers to different kinds of questions. The first set of alternatives may be appropriate to a question such as "When did Germany invade Poland?" (where "Sep. 1, 1939," "9/1939," and "1939" would all be appropriate answers). FIG. 6A illustrates answer variants for the answer accordingly to the first policy. The second policy might be appropriate for the question "On what date did Germany invade Poland?" (where only "Sep. 1, 1939" and variants thereof would be appropriate). FIG. 6B illustrates answer variants for the answer according to the second policy. The third policy would be appropriate to the question "In what year did Germany invade Poland?" FIG. 6C illustrates answer variants for the answer according to the third policy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 7 is a flowchart illustrating operation of a type-based semantic variant generation component in accordance with an illustrative embodiment. Operation begins (block 700), and the semantic variant generation component receives a set of question and answer pairs (block 701). The semantic variant generation component receives selection of a question and an answer to the selected question (block 702). The semantic variant generation component determines the type(s) and subtypes(s) in the answer expression (block 703). The semantic variant generation component then performs user verification or correction of the type and subtype (block 704).

The semantic variant generation component performs rule-based expansion based on the type and subtype (block 705). The type-specific rule-based expansions populate type-specific expansion templates at a level of specificity based on the input. The semantic variant generation component then normalizes the regular expressions to account for special characters (block 706).

The semantic variant generation component receives user modifications to the list of answer variants (block 707). The user modifications may include clearing the list of answer variants, adding an answer variant to the list, or deleting an answer variant from the list. The semantic variant generation component determines whether the user selects a save action (block 708). If the user does not select a save action, then operation returns to block 707 to receive user modifications to the list of answer variants.

If the semantic variant generation component determines that a user selects a save action in block 708, then the semantic variant generation component saves the list of answer variants to be used in a question and answer pair for training a question answering machine learning model for a question answering system (block 709). The semantic variant generation component determines whether an exit condition exists (block 710). An exit condition may exist if the user closes the semantic variant generation component, for example. If an exit condition does not exist, then operation returns to block 703 to receive selection of another question and an answer to the selected question. If an exit condition exists in block 710, then operation ends (block 711).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a mechanism for automatic type-based generation of semantic variants of natural language expressions for string or regular expression matching. The mechanism allows the user to use answer variant templates in an attempt to capture as many acceptable answers as possible while reducing the amount of user effort, the possibility of leaving variants out, and the risk of errors in the regular expression.

The illustrative embodiments make it much faster and more accurate to develop answer variants, which is integral to the intended application of creating question and answer pair sets required to train answer ranking models in an open domain question answering cognitive system. The illustrative embodiments also make it possible to flexibly produce answer variants of various types. It is to be expected that training a system with a wider range of automatically generated answers in the question and answer pair set should improve post-training accuracy questions by several points.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory storing a store of semantic types and instructions for implementing a natural language processing engine for generating semantically equivalent variants of a natural language term, wherein the data processing system configured with the natural language processing engine comprises a question answering system, the method comprising:

receiving, by the natural language processing engine, an input term for variant analysis, wherein the input term is an answer to a question forming a question and answer pair for an answer key of the question answering system;

identifying, by the natural language processing engine executing on the data processing system, a semantic type of the input term based on a store of semantic types;

performing, by the natural language processing engine, a type-specific series of rule-based expansions of the input term based on the identified semantic type of the input term to form a set of semantically equivalent variants of the input term;

generating, by the natural language processing engine, a question and answer pair using the question and each semantically equivalent variant within the set of semantically equivalent variants of the input term to form a supplemented answer key;

training, by the natural language processing engine, a question answering machine learning model for the question answering system using the supplemented answer key; and configuring the question answering system to operate in accordance with the question answering machine learning model.

2. The method of claim 1, wherein stores of semantic types comprises a store of a group consisting of a currency type, a person type, a percent type, a date type, a number type, a measurement type, or a range type.

3. The method of claim 1, wherein the memory stores a store of units, conversions among units, and variants of unit names, the method further comprising extracting, by the natural language processing engine, a quantity and a unit from the input term based on the store of units, conversions among units, and variants of unit names.

4. The method of claim 3, wherein performing a type-specific series of rule-based expansions comprises generating number variants based on the extracted quantity.

5. The method of claim 4, wherein generating number variants comprises performing at least one of rounding, varying degree of precision, varying formatting of numbers, or identifying word number variants.

6. The method of claim 3, wherein performing a type-specific series of rule-based expansions comprises performing unit conversion based on the extracted unit.

7. The method of claim 3, wherein performing a type-specific series of rule-based expansions comprises performing unit label conversion based on the extracted unit.

8. The method of claim 1, wherein performing a type-specific series of rule-based expansions comprises performing word variants or date variants.

9. The method of claim 1, further comprising performing normalization of regular expressions to account for special characters.

10. The method of claim 1, further comprising:
generating, by the natural language processing engine, a user interface presenting the set of semantically equivalent variants of the input term; and
receiving, by the natural language processing engine, user input modifying the set of semantically equivalent variants of the input term via the user interface.

11. A computer program product comprising:
a computer readable storage medium having a computer readable program stored therein, wherein the computer readable program, when executed on a data processing system, causes the data processing system to implement a natural language processing engine, wherein the data processing system configured with the natural language processing engine comprises a question answering system, wherein the computer readable program causes the data processing system to:
receive an input term for variant analysis, wherein the input term is an answer to a question forming a question and answer pair for an answer key of the question answering system;

identify, by the natural language processing engine executing on the data processing system, a semantic type of the input term based on a store of semantic types;

perform, by the natural language processing engine, a type-specific series of rule-based expansions of the input term based on the identified semantic type of the input term to form a set of semantically equivalent variants of the input term;

generate, by the natural language processing engine, a question and answer pair using the question and each semantically equivalent variant within the set of semantically equivalent variants of the input term to form a supplemented answer key;

training, by the natural language processing engine, a question answering machine learning model for the question answering system using the supplemented answer key; and configuring the question answering system to operate in accordance with the question answering machine learning model.

12. The computer program product of claim 11, wherein the computer readable storage medium has stored therein a store of units, conversions among units, and variants of unit names, wherein the natural language processing engine further causes the data processing system to extract a quantity and a unit from the input term based on the store of units, conversions among units, and variants of unit names.

13. The computer program product of claim 12, wherein performing a type-specific series of rule-based expansions comprises generating number variants based on the extracted quantity.

14. The computer program product of claim 13, wherein generating number variants comprises performing at least one of rounding, varying degree of precision, varying formatting of numbers, or identifying word number variants.

15. The computer program product of claim 12, wherein performing a type-specific series of rule-based expansions comprises performing unit conversion based on the extracted unit.

16. The computer program product of claim 12, wherein performing a type-specific series of rule-based expansions comprises performing unit label conversion based on the extracted unit.

17. The computer program product of claim 11, wherein performing a type-specific series of rule-based expansions comprises performing word variants or date variants.

18. The computer program product of claim 11, wherein the computer readable program further causes the data processing system to:
generate, by the natural language processing engine, a user interface presenting the set of semantically equivalent variants of the input term; and
receive, by the natural language processing engine, user input modifying the set of semantically equivalent variants of the input term via the user interface.

19. The computer program product of claim 11, wherein the natural language processing engine further causes the data processing system to perform normalization of regular expressions to account for special characters.

20. An apparatus comprising:
a processor; and
a memory coupled to the processor, wherein the memory stores a computer readable program, wherein the computer readable program, when executed on the processor, causes the processor to implement a natural language processing engine, wherein the data processing system configured with the natural language processing engine comprises a question answering system, wherein the computer readable program causes the processor to:

receive, by the natural language processing engine, an input term for variant analysis, wherein the input term is an answer to a question forming a question and answer pair for an answer key of the question answering system;

identify, by the natural language processing engine executing on the data processing system, a semantic type of the input term based on a store of semantic types;

perform, by the natural language processing engine, a type-specific series of rule-based expansions of the input term based on the identified semantic type of the input term to form a set of semantically equivalent variants of the input term;

generate, by the natural language processing engine, a and answer pair using the question and each semantically equivalent variant within the set of semantically equivalent variants of the input term to form a supplemented answer key;

train, by the natural language processing engine, a question answering machine learning model for the question answering system using the supplemented answer key; and configure the question answering system to operate in accordance with the question answering machine learning model.

* * * * *